United States Patent [19]
Kildow

[11] Patent Number: 6,070,808
[45] Date of Patent: Jun. 6, 2000

[54] MOBILE SPRAYING AND CLEANING APPARATUS

[75] Inventor: Richard D Kildow, Somers, Wis.

[73] Assignee: Hygeian Technologies, Ltd., Milwaukee, Wis.

[21] Appl. No.: 09/080,762

[22] Filed: May 18, 1998

[51] Int. Cl.[7] .................................................. A01G 25/09
[52] U.S. Cl. ........................ 239/146; 239/147; 239/322; 239/273
[58] Field of Search .................................... 239/273, 322, 239/146, 147, 722

[56] References Cited

U.S. PATENT DOCUMENTS

| 3,940,065 | 2/1976 | Ware et al. | 239/722 |
|---|---|---|---|
| 4,865,255 | 9/1989 | Luvisotto | 239/722 |
| 5,443,211 | 8/1995 | Young et al. | 239/146 |
| 5,783,117 | 7/1998 | Byassee et al. | 261/29 |

*Primary Examiner*—Kevin Weldon
*Assistant Examiner*—Dinh Q. Nguyen
*Attorney, Agent, or Firm*—Philip P Mann

[57] ABSTRACT

A mobile spraying and cleaning apparatus is provided in the form or a wheeled cart. The cart includes a lower housing that supports and carries a reservoir. The reservoir sits atop the housing over a chamber that contains a fluid pump. Cleaning fluid from the reservoir flows by gravity feed to the pump, and pressurized cleaning fluid is discharged through a spray nozzle coupled to the end of a hose. By wheeling the cart into an area to be cleaned, the user can then use the pressurized spray to clean the area. Preferably, the unit is molded of durable plastic and presents a smooth, attractive exterior that is easy to keep clean and professional looking. If desired, an anti-microbial agent can be added to the plastic to inhibit microbial growth on the unit.

16 Claims, 4 Drawing Sheets

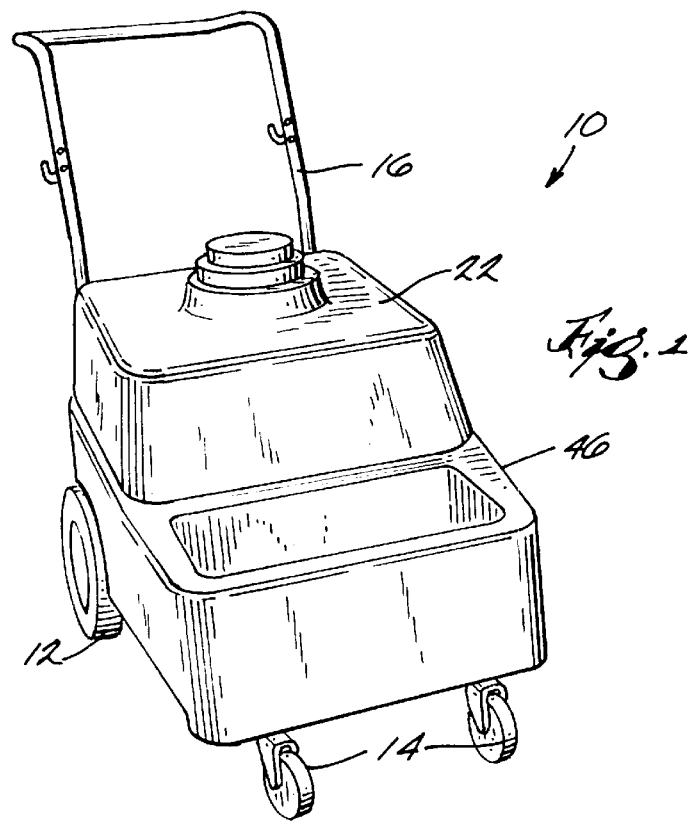
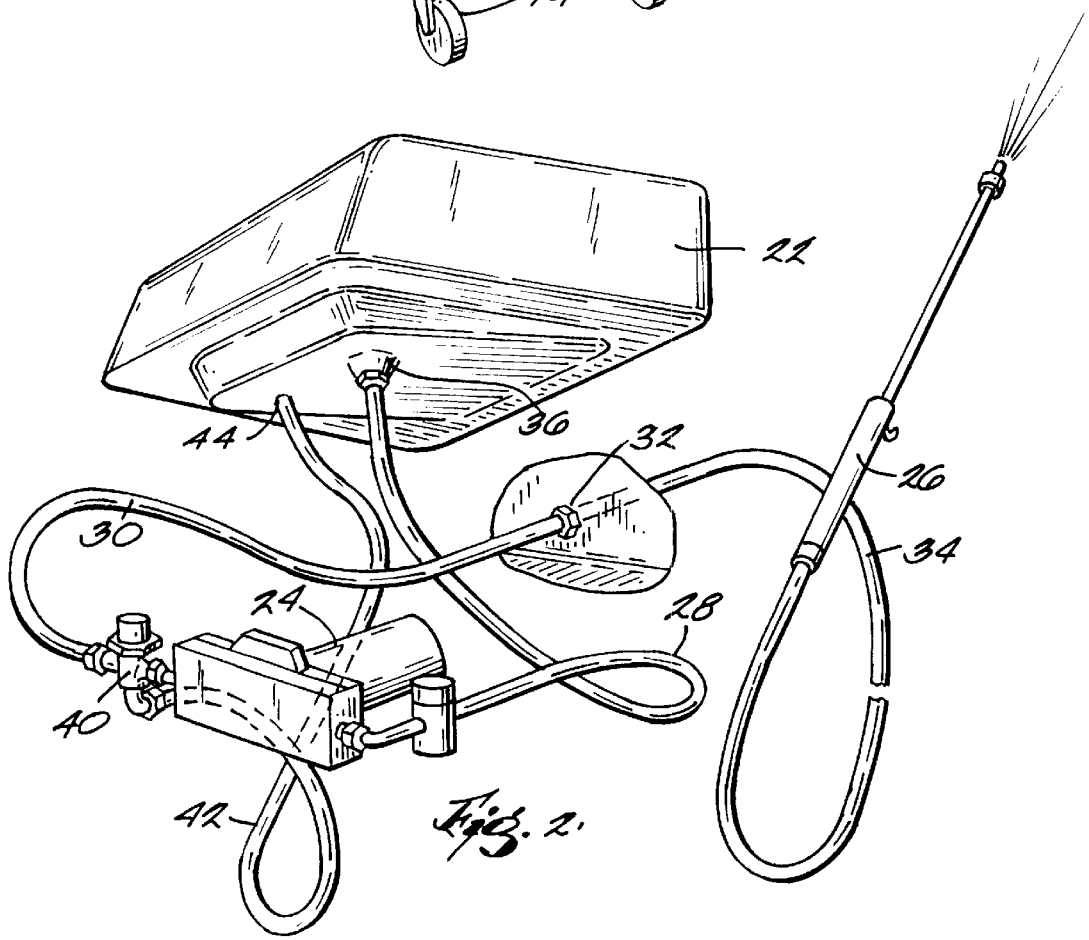

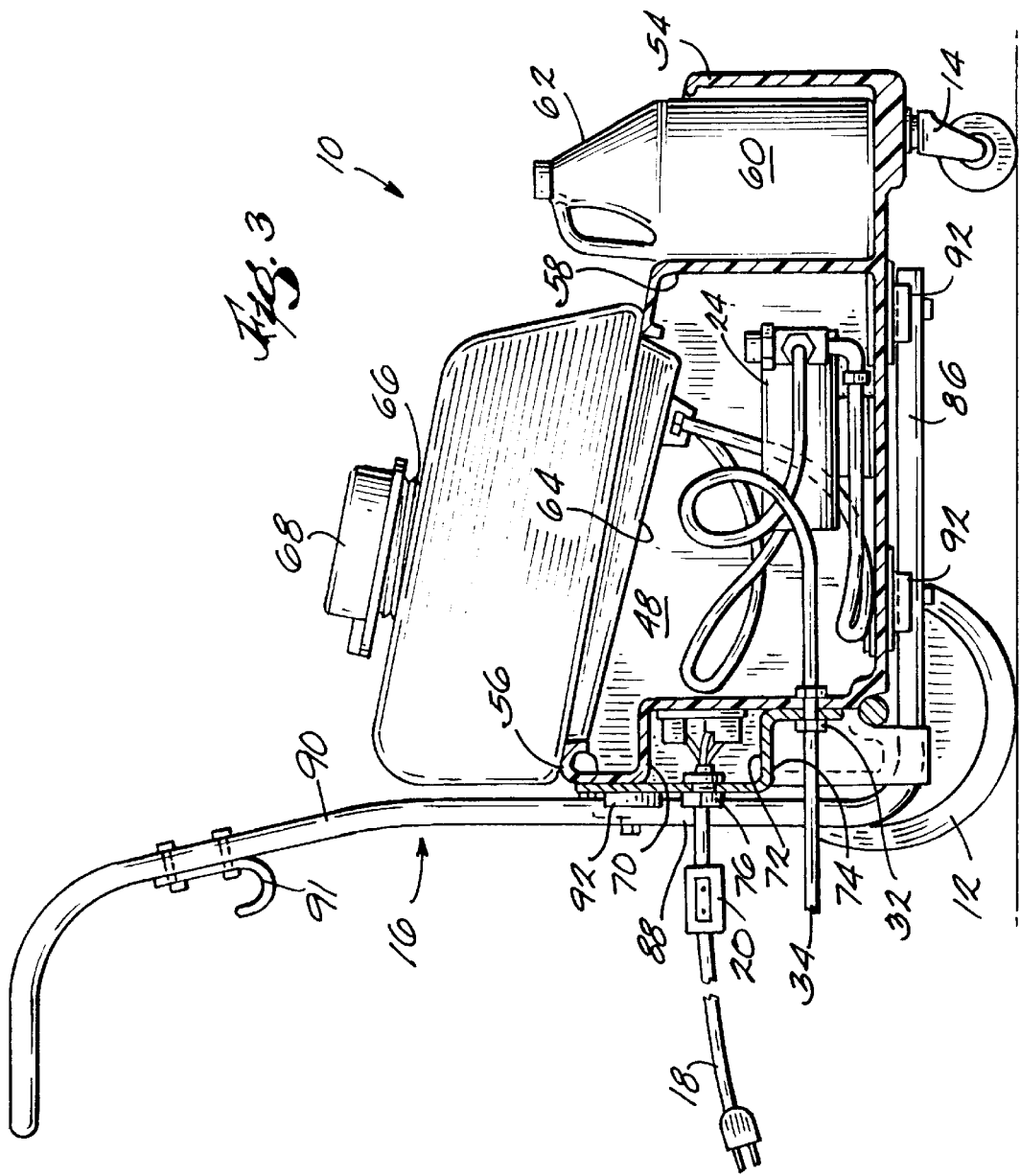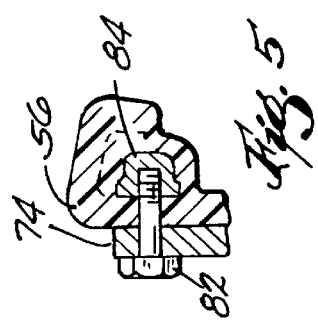

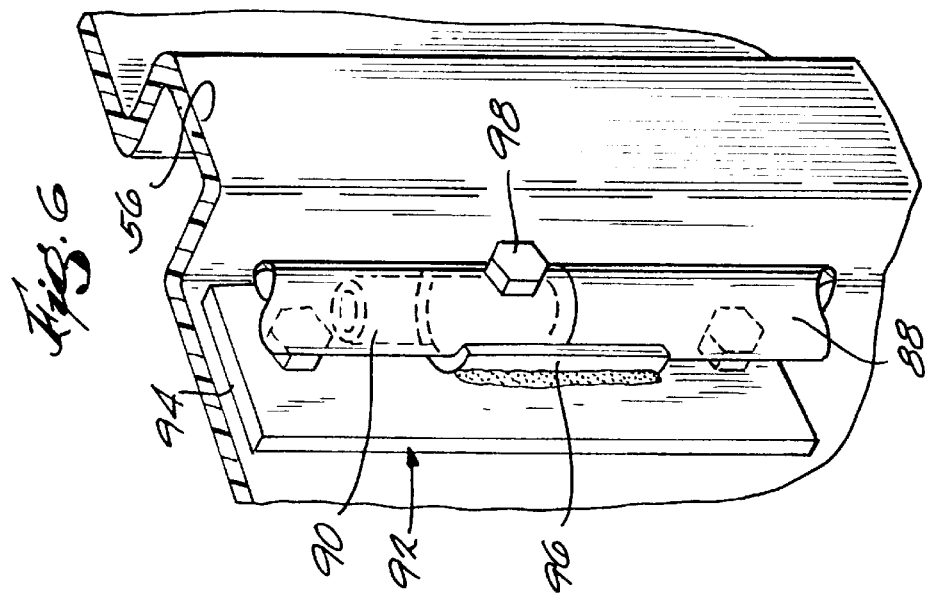
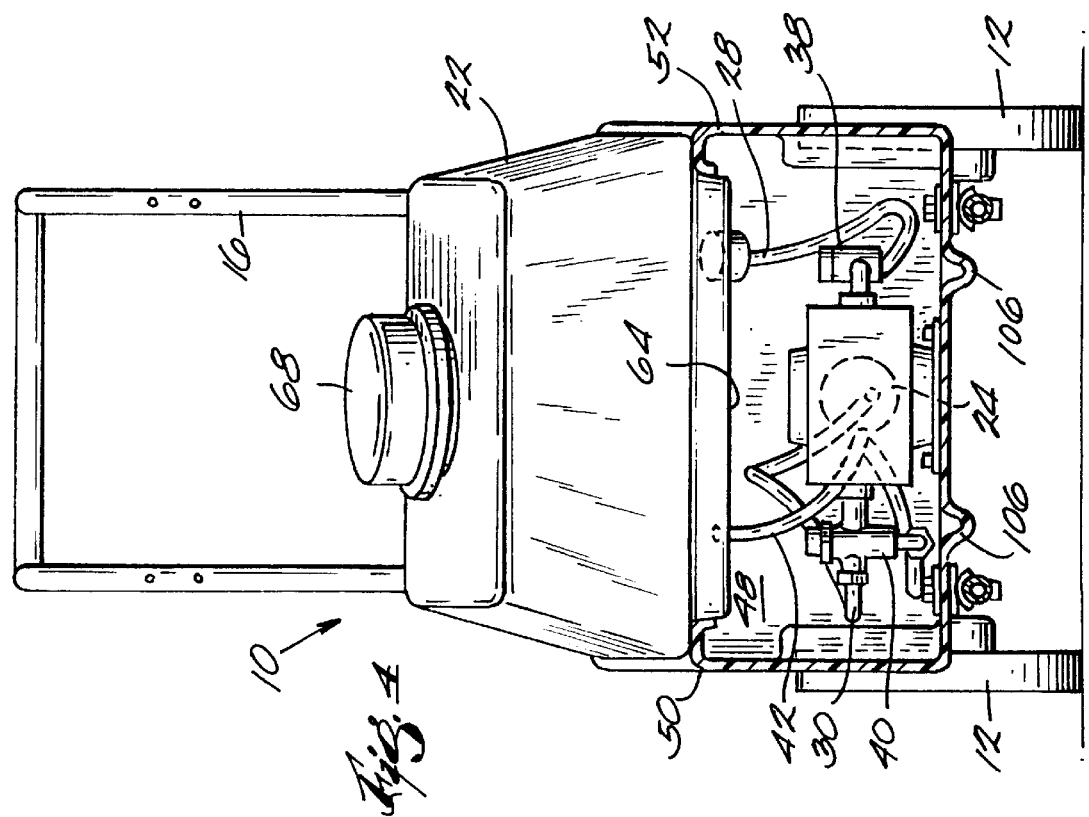

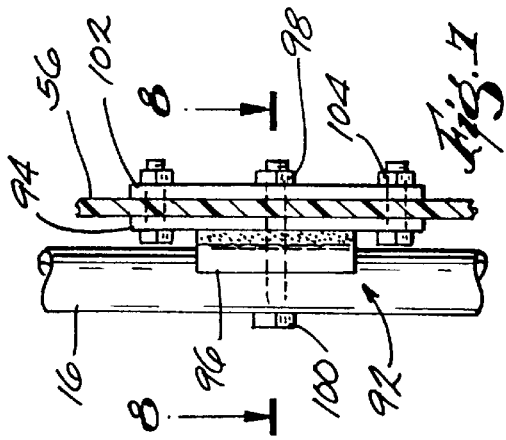
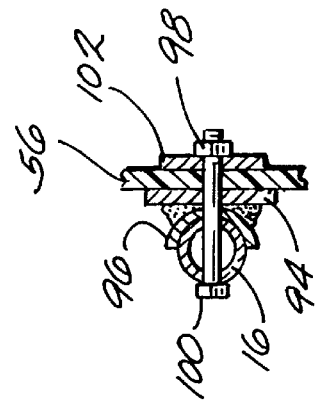
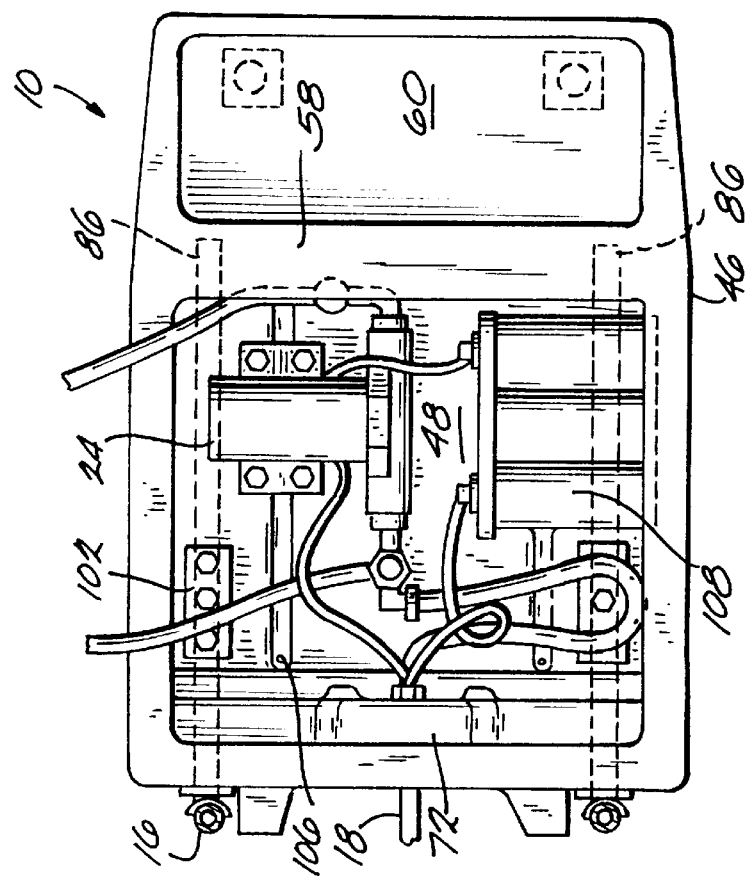

MOBILE SPRAYING AND CLEANING APPARATUS

BACKGROUND OF THE INVENTION

This invention relates generally to spraying and cleaning devices and, more particularly, to a self-contained mobile apparatus useful for cleaning and sanitizing public rest rooms, commercial kitchens, hospital facilities and other types of institutional spaces wherein a high degree of cleanliness is desired.

Today there is an increasing emphasis on maintaining clean-looking and sanitary conditions in a variety of commercial settings. Health care facilities, such as hospitals, clinics and physician's offices, have long recognized the need to keep their premises clean-looking and sanitary. Other businesses are becoming increasingly aware of cleanliness, not only from the standpoint of avoiding potential liability for indoor pollution and health hazards but from maintaining good customer relations and improved employee productivity as well. Today, such diverse businesses as gasoline stations, restaurants, bars, manufacturing plants and retail stores pride themselves on the cleanliness of their rest rooms and other areas available to public use. Along with the awareness of the need for clean looking and sanitary facilities comes the need to actually achieve such results in an efficient and cost-effective manner, without exposing the cleaning personnel to health hazards.

It is common for business establishments to clean their facilities one or more times per day. To maintain a high level of cleanliness on a continuous basis and with a reasonable degree of efficiency requires that cleaning procedures be standardized and simplified to the extent practical. One cleaning technique that is particularly well suited for use in rest rooms, kitchens, health care facilities and the like, wherein the walls and floors are tiled and generally impervious to water, utilizes a spray of water, detergent/disinfectant or other cleaning fluid to do the primary cleaning, agitating, disinfecting and rinsing. By spraying a pressurized fluid against the surfaces to be cleaned and allowing the spray to air dry, dirt and grime are agitated and carried away and the surface is disinfected in an effective, time-efficient manner. The need for laborious scrubbing, which may otherwise expose the worker to toxic chemicals and germs, is thus avoided.

A variety of spray cleaning devices have previously been proposed. Typically, such devices comprise a wheeled cart that carries such items as a fluid reservoir, a pressure source and a wand or spray nozzle for spraying pressurized fluid against the surfaces to be cleaned. The cleaning personnel wheel the apparatus around from room to room as needed to perform the required cleaning operations. However, prior devices, as a whole, have not been optimized for use in today's business environment.

In some prior devices, the cart itself is simply a standard, utilitarian cart that is often made of metal and subject to rust and corrosion. Such carts typically are not designed and constructed with ease of cleaning in mind and contain many corners and crevices where dirt and grime can accumulate and harmful bacteria can multiply. With such devices an anomaly can occur, wherein the device that is used to keep facilities clean and spotless itself looks grimy and shabby and serves as a carrier, transporting germs from place to place.

Still other devices are intended for highly specialized use such as cleaning operating rooms in hospitals. Although effective, such devices are large, heavy and expensive and frequently provide far greater capacity than that which is needed for less critical applications. Such specialized devices, although well suited for their intended tasks, are not the best solution for many other applications.

In view of the foregoing, a need exists for a specialized cleaning cart that is well suited to the task of cleaning public and commercial facilities with effectiveness, speed and economy while minimizing worker exposure to cleaning chemicals and contaminated surfaces.

SUMMARY OF THE INVENTION

The invention provides a mobile spraying apparatus comprising a wheeled cart having a lower unit and an upper reservoir unit nested into the lower unit. A pump is disposed within the lower unit. A first conduit communicates fluid from the reservoir to the pump while a second conduit communicates pressurized fluid from the pump. A plurality of wheels are coupled to the lower unit to enable the lower unit to roll along a supporting surface, and a handle is coupled to the lower unit for enabling a user to push and pull the mobile spraying apparatus over the supporting surface.

The invention also provides a self-contained and mobile spraying apparatus comprising a reservoir, a wheeled cart carrying a pump and structure for supporting the reservoir above the pump. A fluid conduit carries fluid from the reservoir downwardly to the pump by force of gravity, and a user controlled discharge nozzle, coupled to the pump, allows the user to direct pressurized fluid against a surface to be cleaned.

The invention also provides mobile spraying apparatus comprising a molded plastic lower unit defining an interior chamber having an open top, a fluid pump disposed within the interior chamber of the lower unit, and one or more wheels coupled to the lower unit for enabling the lower unit to be wheeled over a supporting surface. A molded plastic reservoir is supported by the lower unit and is positioned over the open top of the interior chamber, and a fluid conduit provides fluid communication between the reservoir and the pump under gravity feed.

It is an object of the invention to provide a new and improved mobile spraying and cleaning apparatus.

It is a further object of the invention to provide a new and improved mobile spraying and cleaning apparatus that is well suited for cleaning public rest rooms, kitchens, health care and other commercial facilities.

It is a further object of the invention to provide new and improved mobile spraying and cleaning apparatus that is simple and economical in use and manufacture and that is easy to maintain.

It is a further object of the invention to provide a new and improved mobile spraying and cleaning apparatus that is attractive in appearance and easily maintained in a clean and professional-looking manner.

It is a further object of the invention to provide a new and improved mobile spraying and cleaning apparatus that provides a one-step cleaning ability that avoids the need for separate cleaning and rinsing steps.

It is a further object of the invention to provide a new and improved mobile spraying and cleaning apparatus that is easy and pleasant to use and that avoids the difficult and unpleasant drawbacks of traditional hand cleaning methods.

It is a further object of the invention to provide a new and improved mobile spraying and cleaning apparatus that is durable, of high quality and that will withstand frequent use without physical degradation over a long service life.

It is a further object of the invention to provide a new and improved mobile spraying and cleaning apparatus that minimizes operator contact with, or exposure to, cleaning fluids and/or contaminated surfaces being cleaned.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a front perspective view of a spraying and cleaning apparatus embodying various features of the invention.

FIG. 2 is a diagrammatic view of the primary operative elements of the spraying and cleaning apparatus shown in FIG. 1, useful in understanding the operation thereof.

FIG. 3 is a side view, partially in section, of the spraying and cleaning apparatus shown in FIG. 1.

FIG. 4 is a front view, partially in section, of the spraying and cleaning apparatus shown in FIG. 1.

FIG. 5 is a fragmentary detail view of an arrangement for securing a metal panel to a plastic housing used in the spraying and cleaning apparatus shown in FIG. 1.

FIG. 6 is a fragmentary, perspective detail view of an arrangement for securing a metal handle to the plastic housing of the spraying and cleaning apparatus shown in FIG. 1.

FIG. 7 is a fragmentary side elevation view of the arrangement for securing a metal handle to the plastic housing of the spraying and cleaning apparatus shown in FIG. 1.

FIG. 8 is a cross-sectional view of the arrangement shown in FIG. 7 taken along line 8-8 thereof.

FIG. 9 is a top view, partially in section, of an alternate embodiment spraying and cleaning apparatus embodying various features of the invention and arranged for battery-powered operation.

DESCRIPTION OF THE PREFERRED EMBODIMENT

Referring to the drawings, and in particular to FIGS. 1, 2 and 3, a cleaning and spraying apparatus 10 embodying various features of the invention is illustrated. The cleaning and spraying apparatus 10 generally takes the form of a wheeled cart that can be rolled from room to room and facility to facility over a floor or other supporting surface. A pair of relatively larger wheels 12 are mounted at the rear of the unit, and a pair of relatively smaller wheels 14 are mounted for swivelling movement at the front of the unit. The swivelling action of the front wheels 14 allows the unit to be easily maneuvered by the operator. A user-graspable handle 16 extends upwardly and outwardly from the rear of the unit. Power for operating the unit is provided through an electrical power cord 18, that can be plugged into a standard 120 volt, alternating current (VAC) electrical outlet. Preferably, the power cord 18 includes a built-in ground fault circuit interrupter (GFCI) 20 to enhance operator safety.

The cleaning and spraying apparatus 10 functions broadly to supply a pressurized cleaning solution or fluid that can be sprayed against a surface to be cleaned. The spraying action agitates or otherwise dislodges dirt and grime, which are then carried away by the fluid runoff. Preferably, this occurs as a one-step process that avoids the need for separate cleaning and rinsing operations.

As illustrated diagrammatically in FIG. 2, the cleaning and spraying apparatus 10 includes a reservoir 22 for containing the cleaning solution, a pump 24 for pressurizing the cleaning solution and a user-actuable spray nozzle 26 for discharging the pressurized solution under the direction and control of the user or operator. Unpressurized cleaning solution is conveyed to the pump 24 by means of a first fluid conduit 28, and pressurized solution is conveyed from the pump 24 by means of a second fluid conduit 30. Preferably, each conduit 28, 30 comprises a length of flexible hose. Although the pressure capacity of the first conduit 28 is not critical, the second conduit 30, which carries pressurized fluid from the pump, should have a pressure capacity well in excess of the maximum pressure supplied by the pump 24. A suitable motor for this application is available from Pumptec, Inc., of Minneapolis, Minn. under Ser. No. 112.

Pressurized cleaning fluid from the pump 24 is conveyed by the second conduit 30 to a fitting 32 positioned at the back of the unit. A flexible, pressure resistant hose 34 is connected between the fitting and the nozzle 26 and conveys the pressurized cleaning solution to the nozzle 26.

One end of the first conduit 28 connects to a fluid port 36 formed in the underside of the reservoir 22 while the other end is coupled to the inlet port of the pump 24. Preferably, a filter 38 is provided between the conduit 28 and the inlet port of the pump 24 to filter the cleaning solution before it reaches the pump. Preferably, a pressure regulator 40, having a bypass port, is provided between the discharge port of the pump 24 and the second conduit 30. A third or bypass conduit 42 leads from the bypass port of the regulator 40 to a second fluid port 44 formed in the underside of the reservoir 22. To the extent the volume of cleaning solution discharged by the pump 24 exceeds that being discharged through the spray nozzle 26, the pressure regulator 40 functions to bypass the excess cleaning solution through the bypass conduit 42 and back to the reservoir 22.

Referring further to FIGS. 1, 2 and 3, the cleaning and spraying apparatus 10 includes a lower unit or housing 46 that is supported by the wheels 12 and 14 and that, in turn, supports the reservoir 22. The lower unit 46 defines an interior chamber 48 having an open top in which the lower side of the reservoir 22 is received. The pump 24, along with the fluid conduits 28, 30 and 42, are housed within the chamber 48. Preferably, the pump 24 is bolted or otherwise rigidly affixed to the bottom of the chamber 48.

As illustrated, the lower unit 46 is of generally rectangular form and includes a pair of downwardly sloping sides 50 and 52, and further includes front and back walls 54 and 56. A partition 58 extending between the sides 50 and 52 defines the forward boundary of the interior chamber 48 and defines a forward exterior chamber 60 at the forward end of the cleaning and spraying apparatus 10. The forward exterior chamber 60 remains open at all times and can be used to contain and transport various accessories and supplies, such as jugs 62 containing concentrated cleaning agents that can be diluted with water to make the cleaning solution. The top edges of the sides 50 and 52, the back wall 56 and the partition 58 define the open top of the interior chamber 48 and define a generally rectangular ledge that supports the reservoir 22.

The reservoir 22 is also of generally rectangular form and includes a projecting bottom surface 64 shaped and dimensioned to fit closely within the open top of the interior chamber 48. A portion of the reservoir 22 extends outwardly around the periphery of the reservoir bottom surface 64 to form a complementary ledge that engages and rests upon the ledge formed by the top edges of the sides 50 and 52, the back wall 56 and the partition 58 around the open top of the interior chamber 48. The reservoir is shaped and dimensioned so that its own side walls generally align with the sides and back walls of the lower unit 46 when the reservoir 22 is in place. Preferably, and as best seen in FIGS. 3 and 4, the sidewalls of the reservoir 22 taper slightly inwardly toward the top, and the top of the reservoir slopes somewhat downwardly toward the front of the spraying and cleaning apparatus 10. A filling port 66 is provided in the top of the reservoir 22 and is accessed through a removable cap 68.

As best seen in FIG. 3, the back wall 56 includes a substantially rectangular recess 70 that forms an enclosure 72 for the electrical connections made within the apparatus 10. A rigid plate 74, formed of stainless steel, aluminum, rigid plastic or other durable, rigid material, is fastened over the recess 70 to form the fully sealed enclosure 72. In addition, the plate 74 provides a mounting surface for supporting a strain relief 76 for the electrical cord 18, the discharge fitting 32, and other elements, such as a fuse holder and a power switch. As illustrated, the discharge fitting 32 extends through both the plastic back wall 56 of the housing 46 and the plate 74. In this manner, the plate 74 reinforces and supports the discharge fitting 32 and helps keep the fitting 32 from pulling through the plastic back wall 56 of the housing 46 in the event someone pulls on the spray nozzle 26 or spray nozzle hose 34.

The rigid plate 74 is secured by fasteners 82 that engage the lower unit 46. Preferably, the fasteners comprise screws or bolts that thread into nuts 84 that, in turn, are molded into the plastic of the housing 46 in the manner best seen in FIG. 5. With the plate 74 in place, the electrical connections within the enclosure 72 are protected against casual or unauthorized access during use. However, when necessary, the fasteners 82 and rigid plate 74 can be removed to gain access to these connections.

The handle 16 is preferably formed of metal tubing. The handle includes two forward ends 86 that extend under the lower unit 46 and a rear portion 88 that extends upwardly along the back wall 56 of the lower unit 46 and outwardly to form a user-grip portion 90. If desired, the grip portion 90 can be covered with a rubber or similar covering to enhance user comfort. Preferably, the handle 16 is formed of stainless steel to provide a non-corroding, clean looking appearance. Alternatively, the handle 16 can be formed of painted steel, aluminum, rigid plastic or other such material. In the illustrated embodiment, the upper or grip portion 90 of the handle 16 can be detached from the lower unit 46 for shipping or storage. A pair of hooks 91 can be mounted onto the handle 16 for holding the power cord 18, the spray nozzle 26 and the spray nozzle hose 34 when the spraying and cleaning apparatus 10 is not in active use.

The manner in which the metal components of the handle 16 are attached to the plastic housing components 46 can best be understood by reference to FIGS. 6,7 and 8. As illustrated, a plurality of saddle assemblies 92 are positioned between the tubular members of the handle 16 and the plastic housing 46 at various attachment points. Each saddle assembly 92 includes a generally rectangular mounting plate 94 having an arcuate saddle member 96 welded thereto. Each saddle member 96 is shaped and dimensioned to closely receive the adjacent tubular portion of the handle 16 therein. The mounting plate 94 is bolted or otherwise affixed to the plastic housing 46, and the handle 16 is nested into the saddle members 96. A plurality of nuts 98 and bolts 100 extend through the handle 16, the saddle member 96, the mounting plate 94 and the housing 46 to secure the handle 16 to the housing 46. Preferably, a backing plate 102 is included opposite the saddle assembly 92 on the interior of the housing 46 to keep the nuts 100 and bolts 102 from pulling through. Preferably, additional fasteners 104 extending through the saddle assemblies 92, housing 46 and backing plates 102 keep the saddle assemblies 92 secured to the housing 46 even when the nuts 98 and bolts 100 holding the handle 16 are removed.

In the illustrated embodiment, four saddle assemblies 92 are used to secure the forward ends 86 of the handle 16 to the underside of the housing 46, while two additional saddle assemblies 92 secure the handle 16 to the back wall 56 of the housing 46. As best seen in FIG. 6. the lower ends of the handle grip portion 90 receive and engage the upper ends of the handle rear portions 88, while the adjacent bolts 100 extending through these interengaged portions secure the handle portions to each other and to the adjacent saddle assembly 92. By removing the bolts 100, the handle portions 90 and 88 can then be separated.

In use, water is poured into the reservoir 22 through the filling port 66, and a concentrated cleaning agent is added to the water to form the cleaning solution. The cleaning solution thus formed flows under gravity through the conduit 28 to the pump 24. The gravity feed thus employed does not require that the pump 24 draw fluid from the reservoir 22 by suction as would be the case if the reservoir 22 were located lower than the pump 24. By placing the reservoir 22 above the pump 24, fluid flow to the pump 24 is natural, and the probability of self priming is enhanced. Preferably, one or more drain holes or apertures 106 are formed in the bottom wall of the interior chamber 48 to allow fluid to drain in the event a leak develops in the reservoir 22, the pump 24 or the conduits 28, 30 and 42.

An alternative embodiment of the invention is shown in FIG. 9. In this embodiment, battery operation is provided and the need to "plug" the unit into a standard 120 VAC outlet is avoided.

Such battery operation is particularly advantageous in areas where electrical outlets are unavailable or inconveniently located. In the illustrated embodiment, the pump 24 is designed to operate from 12 VDC that is supplied directly from a rechargeable battery 108. Preferably, the battery 108 is suitable for mounting in a variety of positions. Such a suitable battery 108 is available from Optima Batteries, Inc. of Aurora CO. under model number AGM-900-M. A suitable 12 volt motor is also available from Pumptec, Inc., of Minneapolis, Minn. under Ser. No. 112. To recharge the battery 108 when the mobile spraying and cleaning apparatus 10 is not in use, any of various known recharging circuits can be employed. Such circuits typically convert standard 120 VAC current to a lower, DC level suitable for recharging the battery 108.

Preferably, the lower unit 46 and the reservoir 22 are each made of molded plastic, such as polyethylene. Rotational molding of these parts is particularly advantageous, although injection molding can also be used. Both the lower unit 46 and the reservoir 22 are preferably configured to have relatively smooth, continuous exteriors that are relatively free of creases, corners and crevices that are difficult to clean and can accumulate grime. This makes it easy to keep the exterior of the cleaning and spraying apparatus 10 clean and professional looking. The use of molded plastic parts, in addition to contributing to manufacturing economy, avoids the potential for corrosion or rusting and helps keep the unit looking good over its service life. If desired, an anti-microbial agent can be added to the plastic components of the unit to inhibit microbial growth. Such a suitable anti-microbial agent is available from Microban Inc., under the product name, "Micro-Ban."

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A mobile spraying apparatus comprising:
   a wheeled cart having a lower unit defining an interior chamber having an open upper end, the wheeled cart further including an upper reservoir unit nested into the open upper end of the lower unit;
   a pump within the lower unit;
   a first conduit for communicating fluid from the reservoir to the pump;
   a second conduit for communicating pressurized fluid from the pump;
   a plurality of wheels coupled to the lower unit to enable the lower unit to roll along a supporting surface,
   and a handle coupled to the lower unit for enabling a user to push and pull the mobile spraying apparatus over the supporting surface.

2. A mobile spraying apparatus as defined in claim 1 wherein the first conduit communicates fluid downwardly from the reservoir to the pump.

3. A mobile spraying apparatus as defined in claim 2 wherein the lower unit and the upper reservoir are each formed of molded plastic.

4. A mobile spraying apparatus as defined in claim 3 wherein the lower unit includes a first compartment under the upper reservoir for housing the pump and a second compartment spaced laterally from the upper reservoir and accessible from the exterior of the apparatus after the upper reservoir is nested into the lower unit.

5. A mobile spraying apparatus as defined in claim 4 wherein the apparatus further includes structure for releasably securing the upper reservoir to the lower unit.

6. A mobile spraying apparatus as defined in claim 5 wherein the structure for releasably securing the upper reservoir to the lower unit comprises a substantially rigid plate extending partially over the lower unit and partially over the reservoir and secured to both the lower unit and the upper reservoir.

7. A mobile spraying apparatus as defined in claim 6 wherein the second conduit communicates pressurized fluid through a fitting mounted on the rigid plate.

8. A mobile spraying apparatus as defined in claim 7 wherein the pump is electrically operated and electrical energy is communicated to the pump through an electrical conductor passing through the rigid plate.

9. A mobile spraying apparatus comprising:
   a reservoir;
   a wheeled cart carrying a pump and structure for supporting the reservoir above the pump;
   a fluid conduit for carrying fluid from the reservoir downwardly to the pump by force of gravity; and
   a user controlled discharge nozzle coupled to the pump for directing fluid pressurized by the pump against a surface to be cleaned; and
   the wheeled cart including a housing defining an interior chamber having an open top adapted to receive and support the reservoir therein, the reservoir thereby forming a closure for the interior chamber.

10. A mobile spraying apparatus as defined in claim 9 wherein the pump is housed in the chamber.

11. A mobile spraying apparatus as defined in claim 10 wherein the chamber and the open top are each of substantially rectangular shape an wherein the reservoir includes a lower surface of substantially rectangular shape dimensioned to be received within the open top.

12. A mobile spraying apparatus as defined in claim 11 wherein the housing includes an upper edge defining the open top and wherein the reservoir includes a flange portion substantially surrounding the lower surface and adapted to engage the upper edge to support the reservoir on the housing over the open top.

13. A mobile spraying apparatus as defined in claim 12 wherein the housing and the reservoir include side walls, corresponding ones of which are substantially aligned with each other when the reservoir is supported on the housing.

14. A mobile spraying apparatus as defined in claim 13 wherein the reservoir and the housing are each formed of molded plastic.

15. A mobile spraying apparatus comprising:
   a molded plastic lower unit defining an interior chamber having an open top;
   a fluid pump disposed within the interior chamber of the lower unit;
   one or more wheels coupled to the lower unit for enabling the lower unit to be wheeled over a supporting surface;
   a molded plastic reservoir supported by the lower unit and positioned over the open top of the interior chamber so as substantially to fully occlude the open top of the interior chamber; and
   a fluid conduit for providing fluid communication between the reservoir and the pump under gravity feed.

16. A mobile spraying apparatus as defined in claim 15 wherein the molded plastic used to form the lower unit and the reservoir contains an anti-microbial agent.

* * * * *